United States Patent
Tidmore

[19]

[11] Patent Number: 6,056,375
[45] Date of Patent: May 2, 2000

[54] STORAGE MANTEL

[76] Inventor: Michael O. Tidmore, 612 41st St., Tuscaloosa, Ala. 35405

[21] Appl. No.: 09/247,989

[22] Filed: Feb. 11, 1999

[51] Int. Cl.[7] .................................................. A47B 81/06
[52] U.S. Cl. ....................... 312/9.47; 312/9.55; 312/237; 52/36.3
[58] Field of Search .......................... 52/36.3; 312/9.53, 312/9.54, 9.47, 9.1, 9.9, 204, 237

[56] References Cited

U.S. PATENT DOCUMENTS

| D. 244,137 | 4/1977 | Gorman . | |
|---|---|---|---|
| 544,138 | 8/1895 | Ullrich . | |
| 595,052 | 12/1897 | Fair | 52/36.3 |
| 1,164,024 | 12/1915 | Smith et al. | 52/36.3 |
| 2,868,606 | 1/1959 | Stierna | 312/9.54 |
| 3,171,542 | 3/1965 | Jacobs et al. . | |
| 3,245,736 | 4/1966 | Douthit | 312/9.53 |
| 5,314,077 | 5/1994 | Theosabrata . | |
| 5,415,297 | 5/1995 | Klein et al. . | |

FOREIGN PATENT DOCUMENTS

86/01930  3/1986  WIPO .

Primary Examiner—Peter M. Cuomo
Assistant Examiner—Jerry A. Anderson

[57] ABSTRACT

A storage mantel for storing video and audio media. The storage mantel includes a mantel that is adapted for mounting over an open face of a fireplace. The mantel has a top side, a bottom side, and first and second lateral sides. The top and bottom sides and the first and second lateral sides define a front opening into the mantel. A door closes the front opening of the mantel. The mantel has spaced apart first and second divider walls extending between the top side and bottom side thereof and positioned between the first and second lateral sides. The first and second divider walls are substantially perpendicular to the bottom side of the mantel. A first storage compartment is defined between the first lateral side of the mantel and the first divider wall. A second storage compartment is defined between the first divider wall and the second divider wall. A third storage compartment is defined between the second divider wall and the second lateral side of the mantel.

19 Claims, 2 Drawing Sheets

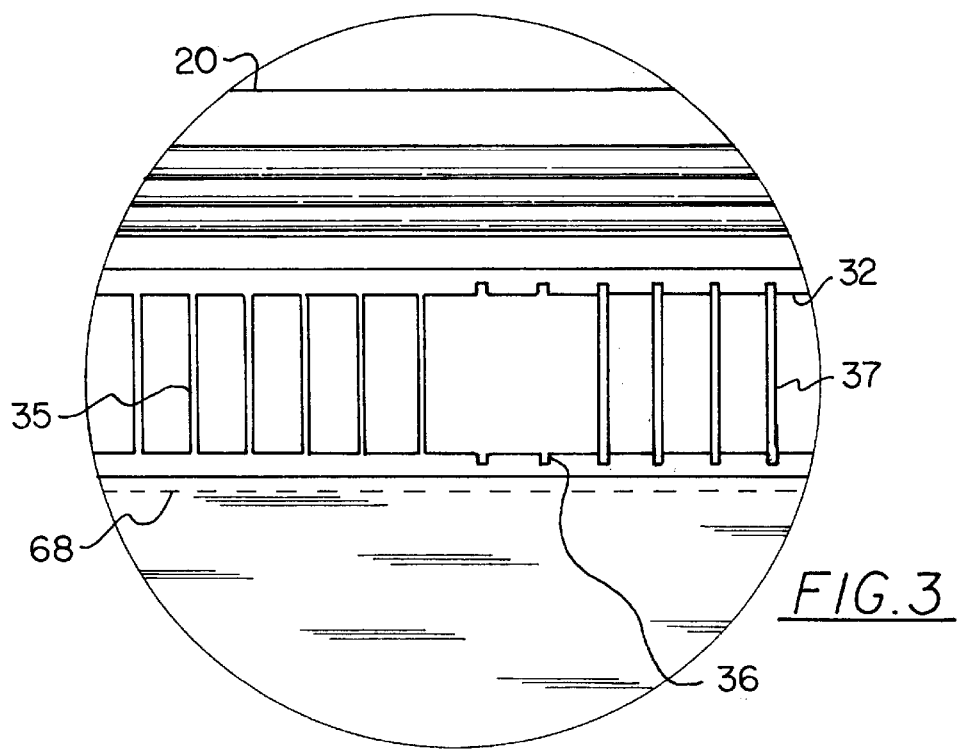
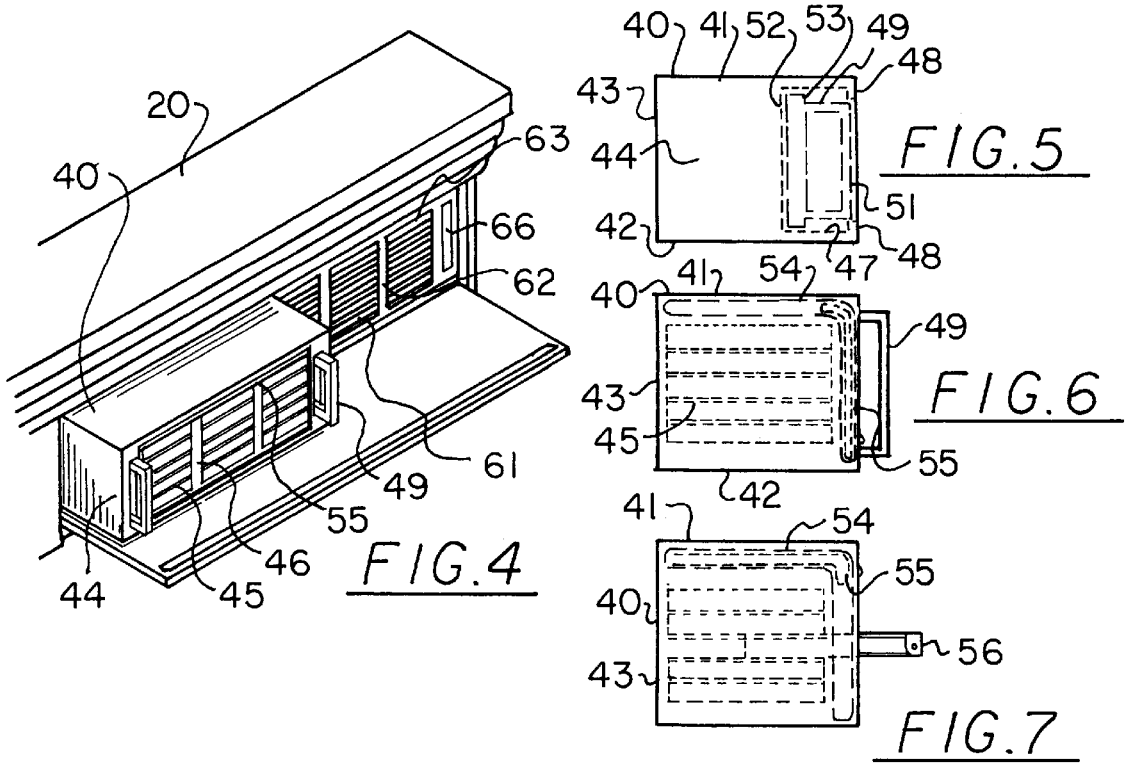

STORAGE MANTEL

BACKGROUND OF THE INVENTION

1. Field of the Invention

The present invention relates to storage containers and more particularly pertains to a new storage mantel for storing video and audio media.

2. Description of the Prior Art

The use of storage containers is known in the prior art. More specifically, storage containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,415,297; U.S. Pat. No. 5,314,077; U.S. Pat. No. 3,171,542; U.S. Pat. No. 544,138; U.S. Pat. No. Des. 244,137; PCT Patent No. WO 86/01930 (Inventor: Frodelius); and PCT Patent No. WO 97/00635 (Inventor: Schneidermesser).

While these devices fulfill their respective, particular objectives and requirements, the aforementioned patents do not disclose a new storage mantel. The inventive device includes a mantel that is adapted for mounting over an open face of a fireplace. The mantel has a top side, a bottom side, and first and second lateral sides. The top and bottom sides and the first and second lateral sides define a front opening into the mantel. A door closes the front opening of the mantel. The mantel has spaced apart first and second divider walls extending between the top side and bottom side thereof and positioned between the first and second lateral sides. The first and second divider walls are substantially perpendicular to the bottom side of the mantel. A first storage compartment is defined between the first lateral side of the mantel and the first divider wall. A second storage compartment is defined between the first divider wall and the second divider wall. A third storage compartment is defined between the second divider wall and the second lateral side of the mantel.

In these respects, the storage mantel according to the present invention substantially departs from the conventional concepts and designs of the prior art, and in so doing provides an apparatus primarily developed for the purpose of storing video and audio media.

SUMMARY OF THE INVENTION

In view of the foregoing disadvantages inherent in the known types of storage containers now present in the prior art, the present invention provides a new storage mantel construction wherein the same can be utilized for storing video and audio media.

The general purpose of the present invention, which will be described subsequently in greater detail, is to provide a new storage mantel apparatus and method which has many of the advantages of the storage containers mentioned heretofore and many novel features that result in a new storage mantel which is not anticipated, rendered obvious, suggested, or even implied by any of the prior art storage containers, either alone or in any combination thereof.

To attain this, the present invention generally comprises a mantel that is adapted for mounting over an open face of a fireplace. The mantel has a top side, a bottom side, and first and second lateral sides. The top and bottom sides and the first and second lateral sides define a front opening into the mantel. A door closes the front opening of the mantel. The mantel has spaced apart first and second divider walls extending between the top side and bottom side thereof and positioned between the first and second lateral sides. The first and second divider walls are substantially perpendicular to the bottom side of the mantel. A first storage compartment is defined between the first lateral side of the mantel and the first divider wall. A second storage compartment is defined between the first divider wall and the second divider wall. A third storage compartment is defined between the second divider wall and the second lateral side of the mantel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new storage mantel apparatus and method which has many of the advantages of the storage containers mentioned heretofore and many novel features that result in a new storage mantel which is not anticipated, rendered obvious, suggested, or even implied by any of the prior art storage containers, either alone or in any combination thereof.

It is another object of the present invention to provide a new storage mantel which may be easily and efficiently manufactured and marketed.

It is a further object of the present invention to provide a new storage mantel which is of a durable and reliable construction.

An even further object of the present invention is to provide a new storage mantel which is susceptible of a low cost of manufacture with regard to both materials and labor, and which accordingly is then susceptible of low prices of sale to the consuming public, thereby making such storage mantel economically available to the buying public.

Still yet another object of the present invention is to provide a new storage mantel which provides in the apparatuses and methods of the prior art some of the advantages thereof, while simultaneously overcoming some of the disadvantages normally associated therewith.

Still another object of the present invention is to provide a new storage mantel for storing video and audio media.

Yet another object of the present invention is to provide a new storage mantel which includes a mantel that is adapted for mounting over an open face of a fireplace. The mantel has a top side, a bottom side, and first and second lateral sides. The top and bottom sides and the first and second lateral sides define a front opening into the mantel. A door closes the front opening of the mantel. The mantel has spaced apart first and second divider walls extending between the top side and bottom side thereof and positioned between the first and second lateral sides. The first and second divider walls are substantially perpendicular to the bottom side of the mantel. A first storage compartment is defined between the first lateral side of the mantel and the first divider wall. A second storage compartment is defined between the first divider wall and the second divider wall. A third storage compartment is defined between the second divider wall and the second lateral side of the mantel.

Still yet another object of the present invention is to provide a new storage mantel that has removable compartments for varying the types of media that can be stored.

Even still another object of the present invention is to provide a new storage mantel that saves space in that it is mountable over the open face of a fireplace.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic detailed view of the present invention taken from circle 3 of FIG. 2.

FIG. 4 is a schematic partial perspective view of the present invention.

FIG. 5 is a schematic side view of a first case of the present invention.

FIG. 6 is a schematic side view of a first case of the present invention.

FIG. 7 is a schematic side view of a first case of the present invention.

DESCRIPTION OF THE PREFERRED EMBODIMENT

Figure 1:
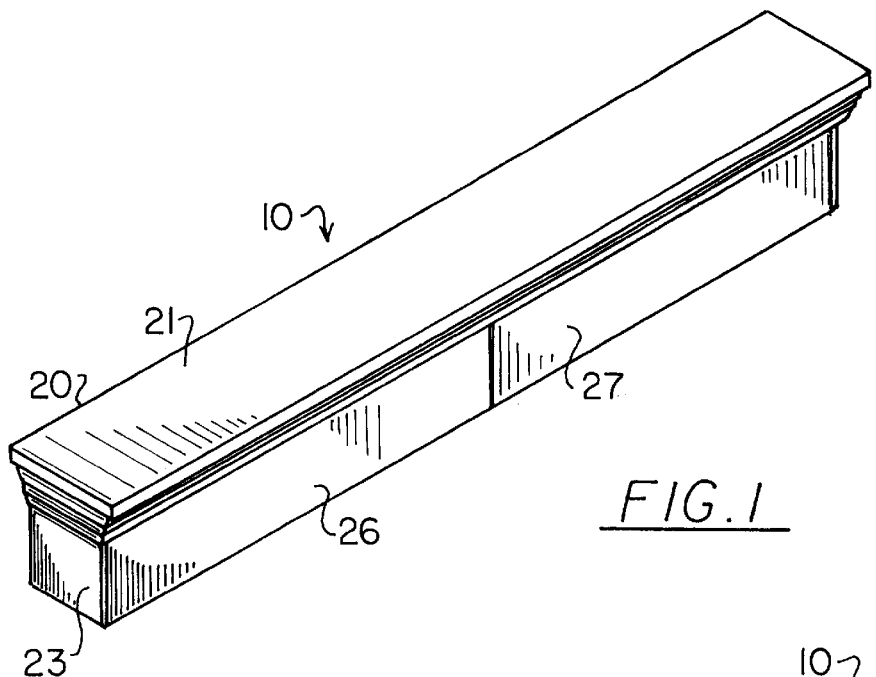
FIG. 1 is a schematic perspective view of a new storage mantel according to the present invention.
Figure 2:
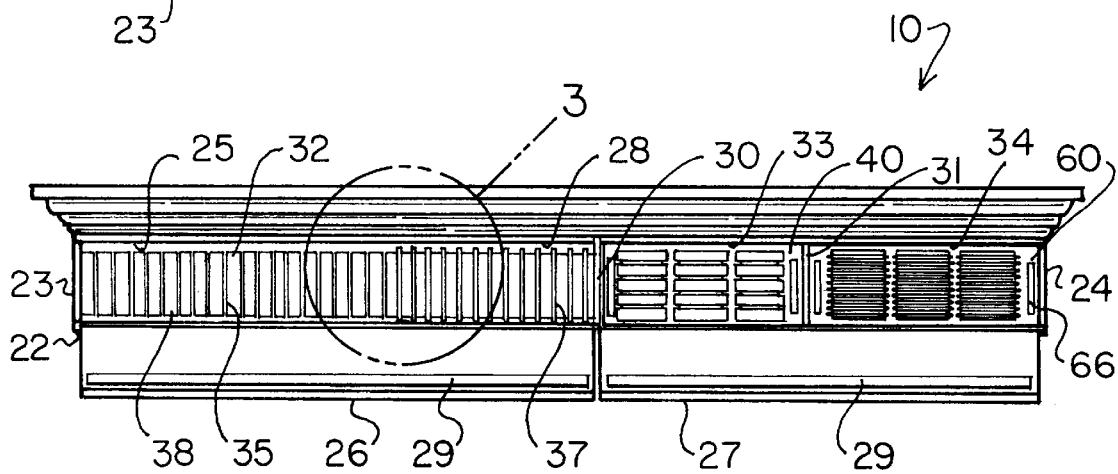
FIG. 2 is a schematic front view of the present invention.

With reference now to the drawings, and in particular to FIGS. 1 through 7 thereof, a new storage mantel embodying the principles and concepts of the present invention and generally designated by the reference numeral 10 will be described.

As best illustrated in FIGS. 1 through 7, the storage mantel 10 generally comprises a mantel 20 that is adapted for mounting over an open face of a fireplace (not shown) that has a firepit and an open face into the firepit. The mantel has a top side 21, a bottom side 22, and first and second lateral sides 23,24. The top and bottom sides and the first and second lateral sides define a front opening 25 into the mantel. A door 26 closes the front opening of the mantel. The mantel has spaced apart first and second divider walls 30,31 extending between the top side and bottom side thereof and positioned between the first and second lateral sides. The first and second divider walls are substantially perpendicular to the bottom side of the mantel. A first storage compartment 32 is defined between the first lateral side of the mantel and the first divider wall. A second storage compartment 33 is defined between the first divider wall and the second divider wall. A third storage compartment 34 is defined between the second divider wall and the second lateral side of the mantel.

Preferably, first and second doors 26,27 are pivotally coupled to the bottom side of the mantel for closing the front opening of the mantel; Ideally, a hinge (not shown) couples the doors to the bottom side of the mantel. More ideally, the bottom of each of the doors hides the hinges when viewed from a position generally perpendicular to the doors when the doors are closed.

Also preferably, the top side of the mantel has a magnetic strip 28 coupled to a front edge thereof, each of the first and second doors has a magnetic strip coupled thereto 29, the magnetic strip of the top side of the mantel attracting the magnetic strips of the first and second doors when the first and second doors are closed such that the first and second doors are held closed.

A length of the first storage compartment is defined between the first lateral side of the mantel and the first divider wall. Preferably, a plurality of first divider panels 35 extend between the top side and bottom side of the mantel along a portion of the length of the first storage compartment. The first divider panels are fixedly coupled to the mantel. Ideally, the first divider panels define a plurality of first sockets each adapted to receive a VCR cassette 38.

Also preferably, the top side and bottom side of the mantel each has a plurality of channels extending therein and facing towards the first compartment. The channels are positioned along another portion of the length of the first storage compartment. Pairs of substantially vertically aligned channels define channel sets.

A plurality of second divider panels 37 are slidably insertable in the channel sets of the top and bottom sides of the mantel. Ideally, the second divider panels define a plurality of second sockets each adapted for receiving a VCR cassette 38. The removable divider panels permit insertion of larger containers in the second compartment, such as double-boxed VCR cassettes.

Preferably, a first case 40 is removably disposed in the second storage compartment of the mantel, the first case has upper and lower sides 41,42, a back side 43, and a pair of sidewalls 44. The first case has a plurality of horizontal panels 45 that extend between its sidewalls. The first case has a plurality of vertical panels 46 that extend between the upper and lower sides of the first case and intersect the horizontal panels. Ideally, the horizontal and vertical panels define a plurality of compartments that are adapted to receive a housing 56 of an audio cassette therein.

Also preferably, each of the sidewalls of the first case has a cavity 47 extending into it from a front edge of the sidewall. A pair of opposed lips 48 extend inwardly from the sidewall along its front edge. The lips are positioned towards the upper and lower sides of the first case.

The first case has a pair of annular first handles 49 that are slidably disposed in the cavities of the sidewalls of the first case. Ideally, each of the first handles of the first case is generally rectangular and has a forward end 51 and a rearward end 52. The rearward end of each of the first handles has a shoulder 53 extending outwardly from it along a plane that extends along the forward and rearward ends thereof. The shoulders of the first handles abut the lips of the sidewalls of the first case such that the forward end of each of the handles may slide out of the cavity but the rearward end remains in the cavity.

Preferably, each of the sidewalls of the first case has a generally L-shaped groove 54 extending into an inner surface thereof along the front edge of the sidewall and the upper side of the first case. A deformable first scrolling door 55 is slidably disposed in the grooves of the sidewalls of the first case. The first scrolling door is slidable along the grooves between an open position and a closed position. As shown in FIG. 6, the first scrolling door is positioned towards the upper side when in the open position. As shown in FIG. 7, the first scrolling door is positioned towards the front edges of the sidewalls when in the closed position.

Preferably, a second case 60 is removably disposed in the third storage compartment of the mantel and has upper and lower sides, a back side, and a pair of sidewalls. The second case has a plurality of horizontal panels 61 that extend between its sidewalls and a plurality of vertical panels 62 extending between the upper and lower sides of the second case and intersecting the horizontal panels. Ideally, the horizontal and vertical panels define a plurality of compartments, each of which is adapted for receiving a housing 63 of a compact disc therein.

Also preferably, each of the sidewalls of the second case has a cavity (not shown) extending into it from a front edge of the sidewall and a pair of opposed lips (not shown) extending inwardly therefrom along the front edge thereof. The lips are positioned towards the upper and lower sides of the second case. The second case has a pair of annular second handles 66 that are slidably disposed in the cavities of the sidewalls of the second case.

More preferably, each of the second handles of the second case is generally rectangular and has a forward end and a rearward end. The rearward end of each of the second handles has a shoulder extending outwardly from it along a plane that extends along the forward and rearward ends thereof. The shoulders of the second handles abut the lips of the sidewalls of the second case such that the forward end of each of the second handles may slide out of the cavity but the rearward end remains in the cavity. The cavities and handles of the second case are like those of the first case.

Each of the sidewalls of the second case has a generally L-shaped groove (not shown) that extends into an inner surface thereof along the front edge of the sidewall and the upper side of the second case. A deformable second scrolling door (not shown) is slidably disposed in the grooves of the sidewalls of the second case. The second scrolling door is slidable along the grooves between an open position and a closed position. The second scrolling door is positioned towards the upper side when in the open position, the second scrolling door is positioned towards the front edges of the sidewalls of the second case when in the closed position. The grooves and second scrolling door of the second case are like the grooves first scrolling door of the first case.

Preferably, the bottom side of the mantel has a layer of insulation 68 extending therealong between the front and back of the mantel for reducing the rate of heat transfer through the bottom side of the mantel and into the storage compartments.

In use, the first door is opened and a VCR cassette and cassette box is placed into one of the first or second sockets of the first compartment of the mantel for storage. If the cassette box of the VCR cassette is too large to fit in a first socket, one or more second divider panels may be removed to accommodate the cassette box. Audio cassettes are placed in the compartments of the first case. Compact discs are placed in the compartments of the second case. To remove either the first case or the second case, the handles of the desired case are extended. The first or second case is removed from the mantel by pulling on the associated handles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

said first case having a plurality of horizontal panels extending between said sidewalls thereof, said first case having a plurality of vertical panels extending between said upper and lower sides of said first case and intersecting said horizontal panels;

said horizontal and vertical panels defining a plurality of compartments, each of said compartments being adapted for receiving a housing of an audio cassette therein;

each of said sidewalls of said first case having a cavity extending therein from a front edge of said sidewall and a pair of opposed lips extending inwardly therefrom along said front edge thereof, said lips being positioned towards said upper and lower sides of said first case;

said first case having a pair of annular first handles being slidably disposed in said cavities of said sidewalls of said first case;

each of said first handles of said first case being generally rectangular and having a forward end and a rearward end, said rearward end of each of said first handles having a shoulder extending outwardly therefrom along a plane extending along said forward and rearward ends thereof, said shoulders of said first handles abutting said lips of said sidewalls of said first case;

each of said sidewalls of said first case having a generally L-shaped groove extending into an inner surface thereof along said front edge of said sidewall and said upper side of said first case;

a deformable first scrolling door being slidably disposed in said grooves of said sidewalls of said first case, said first scrolling door being slidable along said grooves between an open position and a closed position, said first scrolling door being positioned towards said upper side when in said open position, said first scrolling door being positioned towards said front edges of said sidewalls when in said closed position;

a second case being removably disposed in said third storage compartment of said mantel, said second case having upper and lower sides, a back side, and a pair of sidewalls;

said second case having a plurality of horizontal panels extending between said sidewalls thereof, said second case having a plurality of vertical panels extending between said upper and lower sides of said second case and intersecting said horizontal panels;

said horizontal and vertical panels defining a plurality of compartments, each of said compartments being adapted for receiving a housing of a compact disc therein;

each of said sidewalls of said second case having a cavity extending therein from a front edge of said sidewall and a pair of opposed lips extending inwardly therefrom along said front edge thereof, said lips being positioned towards said upper and lower sides of said second case;

said second case having a pair of annular second handles being slidably disposed in said cavities of said sidewalls of said second case;

each of said second handles of said second case being generally rectangular and having a forward end and a rearward end, said rearward end of each of said second handles having a shoulder extending outwardly therefrom along a plane extending along said forward.

I claim:

1. An article of manufacture for storing audio and video media, said article of manufacture comprising:

a mantel being adapted for mounting over an open face of a fireplace;

said mantel having a top side, a bottom side, and first and second lateral sides, said top and bottom sides and said first and second lateral sides defining a front opening into said mantel;

a door for closing said front opening of said mantel;

said mantel having spaced apart first and second divider walls extending between said top side and bottom side thereof and positioned between said first and second lateral sides, said first and second divider walls being substantially perpendicular to said bottom side of said mantel;

a first storage compartment being defined between said first lateral side of said mantel and said first divider wall;

a second storage compartment being defined between said first divider wall and said second divider wall;

a third storage compartment being defined between said second divider wall and said second lateral side of said mantel; and a first case being removably disposed in said second storage compartment of said mantel, said first case having upper and lower sides, a back side, and a pair of sidewalls, said first case having a plurality of horizontal panels extending between said sidewalls thereof, said first case having a plurality of vertical panels extending between said upper and lower sides of said first case and intersecting said horizontal panels, said horizontal and vertical panels defining a plurality of compartments.

2. The article of manufacture of claim 1, wherein said mantel has a magnetic strip coupled to a front edge thereof, said door having a magnetic strip coupled thereto, said magnetic strip of said mantel attracting said magnetic strip of said door when said door is closed such that said door is held closed.

3. The article of manufacture of claim 1, wherein a length of said first storage compartment is defined between said first lateral side of said mantel and said first divider wall, a plurality of first divider panels extending between said top side and bottom side of said mantel along a portion of said length of said first storage compartment, said first divider panels being fixedly coupled to said mantel.

4. The article of manufacture of claim 3, wherein said first divider panels define a plurality of first sockets each adapted for receiving a VCR cassette.

5. The article of manufacture of claim 1, wherein a length of said first storage compartment is defined between said first lateral side of said mantel and said first divider wall, said top side and bottom side of said mantel each having a plurality of channels extending therein and facing towards said first compartment, said channels being positioned along another portion of said length of said first storage compartment, pairs of substantially vertically aligned channels defining channel sets, a plurality of second divider panels being slidably insertable in said channel sets of said top side and bottom side of said mantel.

6. The article of manufacture of claim 5, wherein said second divider panels define a plurality of second sockets each adapted for receiving a VCR cassette.

7. The article of manufacture of claim 1, wherein said bottom side of said mantel has a layer of insulation extending therealong for reducing the rate of heat transfer through said bottom side of said mantel.

8. The article of manufacture of claim 1, wherein each of said compartments is adapted for receiving a housing of an audio cassette therein.

9. The article of manufacture of claim 1, wherein each of said sidewalls of said first case has a first handle slidably extending therefrom.

10. The article of manufacture of claim 9, wherein each of said sidewalls of said first case have a cavity extending therein from a front edge of said sidewall and a pair of opposed lips extending inwardly therefrom along said front edge thereof, said lips being positioned towards said upper and lower sides of said first case, said first handles being annular and being slidably disposed in said cavities of said sidewalls of said first case.

11. The article of manufacture of claim 10, wherein each of said first handles of said first case are generally rectangular and have a forward end and a rearward end, said rearward end of each of said first handles having a shoulder extending outwardly therefrom along a plane extending along said forward and rearward ends thereof, said shoulders of said first handles abutting said lips of said sidewalls of said first case.

12. The article of manufacture of claim 1, wherein each of said sidewalls of said first case have a generally L-shaped groove extending into an inner surface thereof along said front edge of said sidewall and said upper side of said first case, a deformable first scrolling door being slidably disposed in said grooves of said sidewalls of said first case, said first scrolling door being slidable along said grooves between an open position and a closed position, said first scrolling door being positioned towards said upper side when in said open position, said first scrolling door being positioned towards said front edges of said sidewalls when in said closed position.

13. The article of manufacture of claim 1, further comprising a second case being removably disposed in said third storage compartment of said mantel, said second case having upper and lower sides, a back side, and a pair of sidewalls, said second case having a plurality of horizontal panels extending between said sidewalls thereof, said second case having a plurality of vertical panels extending between said upper and lower sides of said second case and intersecting said horizontal panels.

14. The article of manufacture of claim 13, wherein said horizontal and vertical panels define a plurality of compartments, each of said compartments being adapted for receiving a housing of a compact disc therein.

15. The article of manufacture of claim 13, wherein each of said sidewalls of said second case have a cavity extending therein from a front edge of said sidewall and a pair of opposed lips extending inwardly therefrom along said front edge thereof, said lips being positioned towards said upper and lower sides of said second case, said second case having a pair of annular second handles being slidably disposed in said cavities of said sidewalls of said second case.

16. The article of manufacture of claim 15, wherein each of said second handles of said second case are generally rectangular and have a forward end and a rearward end, said rearward end of each of said second handles having a shoulder extending outwardly therefrom along a plane extending along said forward and rearward ends thereof, said shoulders of said second handles abutting said lips of said sidewalls of said second case.

17. The article of manufacture of claim 13, wherein each of said sidewalls of said second case has a generally L-shaped groove extending into an inner surface thereof along said front edge of said sidewall and said upper side of said second case, a deformable second scrolling door being slidably disposed in said grooves of said sidewalls of said second case, said second scrolling door being slidable along said grooves between an open position and a closed position, said second scrolling door being positioned towards said upper side when in said open position, said second scrolling door being positioned towards said front edges of said sidewalls of said second case when in said closed position.

18. An article of manufacture for storing audio and video media, said article of manufacture comprising:
   a mantel being adapted for mounting over an open face of a fireplace;
   said mantel having a top side, a bottom side, and first and second lateral sides, said top and bottom sides and said first and second lateral sides defining a front opening into said mantel;
   a door for closing said front opening of said mantel;
   said mantel having spaced apart first and second divider walls extending between said top side and bottom side thereof and positioned between said first and second lateral sides, said first and second divider walls being substantially perpendicular to said bottom side of said mantel;
   a first storage compartment being defined between said first lateral side of said mantel and said first divider wall;
   a second storage compartment being defined between said first divider wall and said second divider wall;
   a third storage compartment being defined between said second divider wall and said second lateral side of said mantel; and wherein said bottom side of said mantel has a layer of insulation extending therealong for reducing the rate of heat transfer through said bottom side of said mantel.

19. A storage system for storing audio and video media, said storage system comprising, in combination:
   a fireplace having a firepit and an open face into said firepit;
   a mantel being mounted over said open face of said fireplace;
   said mantel having a top side, a bottom side, and first and second lateral sides, said top and bottom sides and said first and second lateral sides defining a front opening into said mantel;
   first and second doors being pivotally coupled to said bottom side of said mantel for closing said front opening of said mantel;
   said top side of said mantel having a magnetic strip coupled to a front edge thereof, each of said first and second doors having a magnetic strip coupled thereto, said magnetic strip of said top side of said mantel attracting said magnetic strips of said first and second doors when said first and second doors are closed such that said first and second doors are held closed;
   said mantel having spaced apart first and second divider walls extending between said top side and bottom side thereof and positioned between said first and second lateral sides, said first and second divider walls being substantially perpendicular to said bottom side of said mantel;
   a first storage compartment being defined between said first lateral side of said mantel and said first divider wall;
   a second storage compartment being defined between said first divider wall and said second divider wall;
   a third storage compartment being defined between said second divider wall and said second lateral side of said mantel;
   a length of said first storage compartment being defined between said first lateral side of said mantel and said first divider wall;
   a plurality of first divider panels extending between said top side and bottom side of said mantel along a portion of said length of said first storage compartment, said first divider panels being fixedly coupled to said mantel, said first divider panels defining a plurality of first sockets each adapted for receiving a VCR cassette;
   said top side and bottom side of said mantel each having a plurality of channels extending therein and facing towards said first compartment, said channels being positioned along another portion of said length of said first storage compartment, pairs of substantially vertically aligned channels defining channel sets;
   a plurality of second divider panels being slidably insertable in said channel sets of said top side and bottom side of said mantel, said second divider panels defining a plurality of second sockets each adapted for receiving a VCR cassette;
   a first case being removably disposed in said second storage compartment of said mantel, said first case having upper and lower sides, a back side, and a pair of sidewalls;
   and rearward ends thereof, said shoulders of said second handles abutting said lips of said sidewalls of said second case;

each of said sidewalls of said second case having a generally L-shaped groove extending into an inner surface thereof along said front edge of said sidewall and said upper side of said second case;

a deformable second scrolling door being slidably disposed in said grooves of said sidewalls of said second case, said second scrolling door being slidable along said grooves between an open position and a closed position, said second scrolling door being positioned towards said upper side when in said open position, said second scrolling door being positioned towards said front edges of said sidewalls of said second case when in said closed position; and said bottom side of said mantel having a layer of insulation extending therealong for reducing the rate of heat transfer through said bottom side of said mantel.

* * * * *